United States Patent
Dron et al.

(10) Patent No.: US 11,023,628 B2
(45) Date of Patent: Jun. 1, 2021

(54) METHOD OF SIMULATING THE OPERATION OF AN ELECTRONIC CIRCUIT AND PROGRAM

(71) Applicants: UNIVERSITE PIERRE ET MARIE CURIE (PARIS 6), Paris (FR); CENTRE NATIONAL DE LA RECHERCHE SCIENTIFIQUE (CNRS), Paris (FR)

(72) Inventors: Wilfried Dron, Chatou (FR); Khalil Hachicha, Paris (FR); Patrick Garda, Thiais (FR)

(73) Assignees: CENTRE NATIONAL DE LA RECHERCHE SCIENTIFIQUE (CNRS), Paris (FR); SORBONNE UNIVERSITE, Paris (FR)

( * ) Notice: Subject to any disclaimer, the term of this patent is extended or adjusted under 35 U.S.C. 154(b) by 501 days.

(21) Appl. No.: 15/742,449

(22) PCT Filed: Jul. 7, 2016

(86) PCT No.: PCT/EP2016/066206
§ 371 (c)(1),
(2) Date: Jan. 5, 2018

(87) PCT Pub. No.: WO2017/005883
PCT Pub. Date: Jan. 12, 2017

(65) Prior Publication Data
US 2018/0203957 A1    Jul. 19, 2018

(30) Foreign Application Priority Data
Jul. 9, 2015 (FR) .................. 1556500

(51) Int. Cl.
G06F 30/20    (2020.01)
G06F 30/30    (2020.01)
G06F 119/06   (2020.01)

(52) U.S. Cl.
CPC .......... G06F 30/20 (2020.01); G06F 30/30 (2020.01); G06F 2119/06 (2020.01)

(58) Field of Classification Search
CPC ....... G06F 30/20; G06F 30/30; F06F 2119/06
(Continued)

(56) References Cited

U.S. PATENT DOCUMENTS 5,633,573 A * 5/1997 van Phuoc ............ H02J 7/0003
                                                320/128
7,286,675 B1 * 10/2007 O'Neill ................ H04R 25/502
                                                381/102

(Continued)

OTHER PUBLICATIONS

Preliminary Research Report received for French Application No. 1556500, dated Apr. 27, 2016, 3 pages (1 page of French Translation Cover Sheet and 2 page of original document).
(Continued)

Primary Examiner — Kamini S Shah
Assistant Examiner — John E Johansen
(74) Attorney, Agent, or Firm — Womble Bond Dickinson (US) LLP

(57) ABSTRACT

The present invention relates to a method of simulating the operation of an electronic circuit modelled by a numerical model comprising successive steps consisting in updating parameters of the model, periodically, at variable or constant simulated time step, when the battery is in a state of non-linear operation, and at each change of state of operation of one of the functional electronic components, when the battery is in a state of quasi-linear operation.

11 Claims, 5 Drawing Sheets

(58) Field of Classification Search
USPC .............................................. 703/2
See application file for complete search history.

(56) References Cited

U.S. PATENT DOCUMENTS

| | | | | |
|---|---|---|---|---|
| 9,762,077 B2* | 9/2017 | Desprez | ................ | H01M 4/525 |
| 2013/0085696 A1* | 4/2013 | Xu | ....................... | G01R 31/367 |
| | | | | 702/63 |

OTHER PUBLICATIONS

International Search Report and Written Opinion received for PCT Patent Application No. PCT/EP2016/066206, dated Sep. 5, 2016, 18 pages (8 pages of English Translation and 10 pages of Original Document).

International Preliminary Report on Patentability received for PCT Patent Application No. PCT/EP2016/066206, dated Jan. 18, 2018, 16 pages (8 pages of English Translation and 8 pages of Original Document).

Glaser et al., "Power Aware Simulation Framework for Wireless Sensor Networks and Nodes", Eurasip Journal on Embedded Systems, vol. 2008, Article Id 369178, 2008, pp. 1-16.

Dron et al., "An Emulation-Based Method for Lifetime Estimation of Wireless Sensor Networks", 2014 IEEE International Conference on Distributed Computing in Sensor Systems, 2014, pp. 241-248.

Dron et al., "A fixed frequency sampling method for wireless sensors power consumption estimation", New Circuits and Systems Conference (NEWCAS), IEEE 11th International, 2013, pp. 1-4.

Bramas et al, Energy Survival of Sensors' Networks, 1Sorbonne Universités, UPMC Univ Paris 06, UMR 7606, F-75005, Paris, France, Algotel 2015, hal-01144309, 2015, 5 pages.

* cited by examiner

METHOD OF SIMULATING THE OPERATION OF AN ELECTRONIC CIRCUIT AND PROGRAM

FIELD OF THE INVENTION

The present invention relates to a method of simulating the operation of an electronic circuit comprising at least one battery and a functional electronic component. The present invention particularly applies to the simulation of communicating embedded systems, and in particular of wireless sensor networks.

STATE OF THE ART

It may be useful to simulate the operation of an electronic circuit comprising at least one battery, in particular to estimate the energy self-sufficiency of an electronic circuit defined as the time during which the electronic circuit operates without failure of one of its main functions further to draining of the powering battery. Draining is considered here to be an insufficient battery energy level to maintain the system in service.

Continuous simulation simulators are known wherein the simulated time is divided into equal time steps. At each time step, all the parameters of the model are re-evaluated including at times when no event occurs, which considerably increases simulation time.

Discrete event simulators are known wherein the parameters of the model are re-evaluated only if an event occurs. An event is typically a change in operating state of a functional electronic component of the circuit. Discrete event simulation overcomes the need to re-evaluate all the model parameters at times when these parameters scarcely vary.

However, a battery does not always have linear behaviour. In particular, when the current delivered by the battery is greater than the nominal current of the battery, the residual capacity of the battery varies non-linearly in relation to the delivered current as illustrated in FIG. 1. FIG. 1 illustrates the actual extractible capacity of a Panasonic CR2032 battery as a function of the current consumed by the load.

Discrete event simulators generally do not allow rapid variations in model parameters to be taken into account during non-linear operation of the battery.

If no functional electronic component changes operating state, there is no event and the model parameters are not re-evaluated. Yet, if the battery is in its non-linear operation area, the parameters of the system may rapidly change without the parameters of the models being re-evaluated, which may lead to major simulation errors.

DISCLOSURE OF THE INVENTION

It is one objective of the invention to propose a simulation method allowing accurate simulation of the non-linear operation of a battery and of the system by which it is powered, while limiting the volume of computation required.

This objective is reached by the present invention with a method of simulating the operation of an electronic circuit, implemented by computer, the electronic circuit comprising at least one battery and a functional electronic component powered by the battery, the electronic circuit being modelled by a numerical model wherein:

the battery has two operating states, including a quasi-linear operating state in which a residual capacity of the battery varies quasi-linearly with the intensity of the instantaneous current delivered by the battery, and a non-linear operating state in which the residual capacity of the battery varies non-linearly with the intensity of the instantaneous current delivered by the battery, the functional electronic component has several operating states, each operating state corresponding to an instantaneous current consumed by the electronic component, the method comprising successive steps consisting of updating parameters of the module, the parameters including a current residual capacity of the battery $C_R(t)$, an instantaneous current $i_{delivered}(t)$ delivered by the battery, a current value of battery internal resistance and a current powering voltage of the battery $V(t)$, the updating step being executed:

periodically at a predefined simulated time interval, when the battery is in the non-linear operating state, and at each change in operating state of one of the functional electronic components, when the battery is in the quasi-linear operating state.

The proposed simulation method allows adjustment of the frequency of updates of parameters of the model as a function of the desired accuracy. When the battery behaves linearly, the updates occur only when a functional electronic component changes operating state. When the battery behaves non-linearly, the parameters of the model are updated periodically, which allows accurate reproduction of all the non-linearities of the battery.

The proposed simulation method therefore allows consideration to be given first to the particular structure of the electronic circuit under consideration involving changes in operating state of the functional components of the electronic circuit, and secondly to rapid variations in the parameters of the system when the battery is in non-linear operation.

The invention is advantageously completed by the following characteristics taken individually or in any technical possible combination thereof.

The updating step is executed periodically at constant time intervals when the battery is in the non-linear operating state.

The updating step is executed periodically at variable time intervals of duration inversely proportional to the value of the delivered instantaneous current $i_{delivered}(t)$, when the battery is in the non-linear operating state.

The functional electronic component is modelled by a functional electronic component model having as parameter at least a consumed instantaneous current $i_{consumed}(t)$.

The battery is modelled by a battery model having at least a powering voltage $V(t)$, a delivered instantaneous current $i_{delivered}(t)$, and residual capacity $C_R(t)$ as parameters.

The functional electronic component model and the battery model further have a component temperature and a battery temperature as parameters.

The simulation method comprises steps of:

comparison of the instantaneous current $i_{delivered}(t)$ delivered by the battery, with a threshold value corresponding to the nominal current of the battery;

if the delivered instantaneous current $i_{delivered}(t)$ is smaller than the nominal current of the battery, the parameters of the model are updated at the updating step of parameters of the model, at the time corresponding to the next change in mode of the functional electronic component;

if the delivered instantaneous current $i_{delivered}(t)$ is greater than the nominal current of the battery, the parameters of the model are updated at the updating step of the parameters of the model, at the next time remote of the time step from a current time.

The step of updating the parameters of the model (E5, E5") consists of the following sub-steps to update the parameters of the model:

updating the values of the consumed instantaneous current $i_{consumed}(t_i)$ of the different functional components as a function of the preceding value of the powering voltage V $(t_{i-1})$ and of the current state of the functional component; updating the value of the delivered instantaneous current $i_{delivered}(t_i)$ as a function of the values of the consumed instantaneous current $i_{consumed}(t_i)$ of the different functional components;

updating the value of the residual capacity $C_R(t_i)$ as a function of the preceding value of the residual capacity $C_R(t_{i-1})$, of the value of the delivered instantaneous current $i_{delivered}(t_i)$ and of the lapsed time $\Delta t$ since the last update;

updating the value of the internal resistance $r(t_i)$. of the battery as a function of the updated value of the residual capacity of the battery $C_R(t_i)$;

updating the value of the powering voltage $V(t_i)$ as a function of the updated value of the residual capacity of the battery $C_R(t_i)$ and of the updated value of the internal resistance of the battery.

The updated value of the residual capacity $C_R(t_i)$ are calculated using the equation:

$$C_R(t_i) = C_R(t_{i-1}) - (i_{eq}(t_i) \times \Delta t) \text{ with } i_{eq}(t) = \frac{Cnominal}{Ceff(i_{delivered}(t))} \times i_{delivered}(t),$$

with: $\Delta t = t_i - t_{i-1}$, with $t_i$ being the time of said update and $t_{i-1}$ being the time of the previous update;

Cnominal being the nominal capacity of the battery;

Ceq(i(t)) being the effective capacity of the battery.

The model comprises a piloting function of simulated time defining the operating states of the functional electronic components and times of change in operating states, from the starting time of simulation up until an end time, the method further comprising a step (E6), after each step of updating the parameters (E5, E5'), of updating the time piloting function.

The steps of updating the parameters of the model are repeated until the voltage at the terminals of the battery V (t) is lower than a predefined threshold value corresponding to the cut-off voltage of the battery, or until the residual capacity of the battery $C_R(t)$ is lower than a predefined threshold value.

The invention also proposes a method for determining the energy self-sufficiency of a battery in an electronic circuit comprising at least one battery and a functional electronic component powered by the battery, consisting of simulating the operation of the electronic circuit with a method according to claim 11, the energy self-sufficiency of the battery being determined as being equal to the duration of time between the time corresponding to the starting of simulation and the time corresponding to the end of simulation.

The invention also proposes a computer program product comprising program code instructions for executing the steps of the method when said program is executed on a computer.

DESCRIPTION OF THE FIGURES

Other objectives, characteristics and advantages will become apparent from the following detailed description with reference to the drawings that are given for illustrative purposes and are nonlimiting, among which.

DETAILED DESCRIPTION OF THE INVENTION

In a method for simulating the operation of an electronic circuit, the electronic circuit is modelled by a numerical model.

In this numerical model, the battery is modelled by a battery model and the functional electronic components by a functional electronic component model.

Functional Electronic Component Model

A functional electronic component is an electronic component intended to be assembled with others to obtain one or more electronic functions. The components form very numerous types and categories. They are particularly characterized by their function and consumption.

For best modelling of the operation of a functional electronic component, the functional electronic component model, at least includes a consumed instantaneous current $i_{consumed}(t)$, and a powering voltage $V(t)$ of the component as parameters.

Functional electronic components have several operating states.

For each operating state there is a corresponding specific configuration of the elements integrated in the circuit. There is therefore a resulting consumption specific to each operating state.

To model this phenomenon, the functional electronic component model is defined as having several operating states, each operating state corresponding to a consumed instantaneous current $i_{consumed}(t)$.

The simplest components may only have two operating states: the active or "ON" state in which the consumed instantaneous current $i_{consumed}(t)$ is nonzero, and the inactive or "OFF" state in which the consumed instantaneous current $i_{consumed}(t)$ is zero.

The more complex components have other operating states such as the low consumption state "Low Power" when the component is active without performing any task and when the consumed instantaneous current $i_{consumed}(t)$ is lower than in the active state.

For example, a microcontroller with variable operating frequency (a function known as Dynamic Voltage Frequency Scaling) is able to operate at different operating frequencies having different consumptions. In the model of a microcontroller having Dynamic Voltage Frequency Scaling, for each operating frequency there is an associated different operating state, each operating state corresponding to a value of consumed instantaneous current $i_{consumed}(t)$. Therefore, a microcontroller having three frequency steps f1, f2 and f3, will be modelled by a functional component model having three operating states Active-f1, Active-f2 and Active-f3, each operating state corresponding to a value of consumed instantaneous current $i_{consumed}(t)$.

Figure 2A:
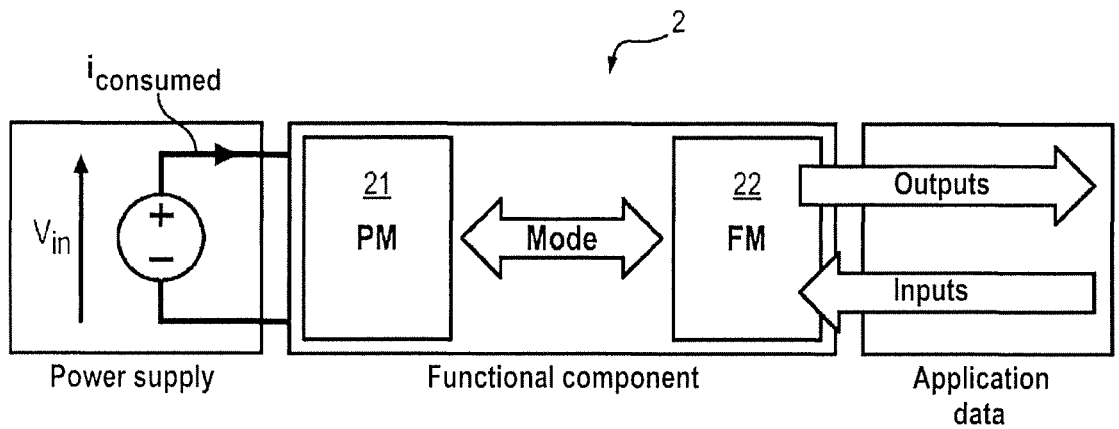
FIG. 2a schematically illustrates a model of a functional electronic component.

As illustrated in FIG. 2a, a functional electronic component is modelled by a functional electronic component model 2 comprising a functional part 21 modelling the operation of the component and a consumption simulating part 22 modelling its consumption and behaviour with respect to its powering voltage.

Figure 2B:
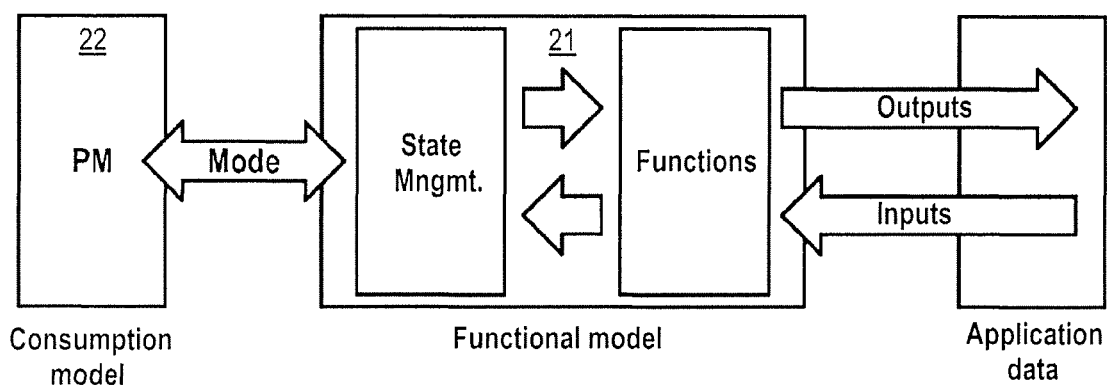
FIG. 2b schematically illustrates a functional part of the functional electronic component model.

FIG. 2b is a schematic illustration of the functional part 21 of a functional component. The functional part of the model models the behaviour of the functional electronic component on data that it processes or generates. Therefore, the functional part of the model of an analogue-digital converter for example will consist of converting an analogue signal to a digital signal taking into consideration its sampling frequency, accuracy, resolution and any other significant parameter required for the desired degree of accuracy. The manner in which the function(s) of the component are modelled is dependent on the type of component. The functions of a microcontroller core for example can be reproduced using an emulator. A radio or converter can be described using a state machine. Finally, the function of a sensor can be described with an equation representing its law of conversion. The modelling of the behaviour of the component in respect of its inputs and outputs is called a function herein.

The management of the operating states of the component can be represented by a state machine or any other representation describing a sequence of states and the conditions associated with these changes.

Figure 2C:
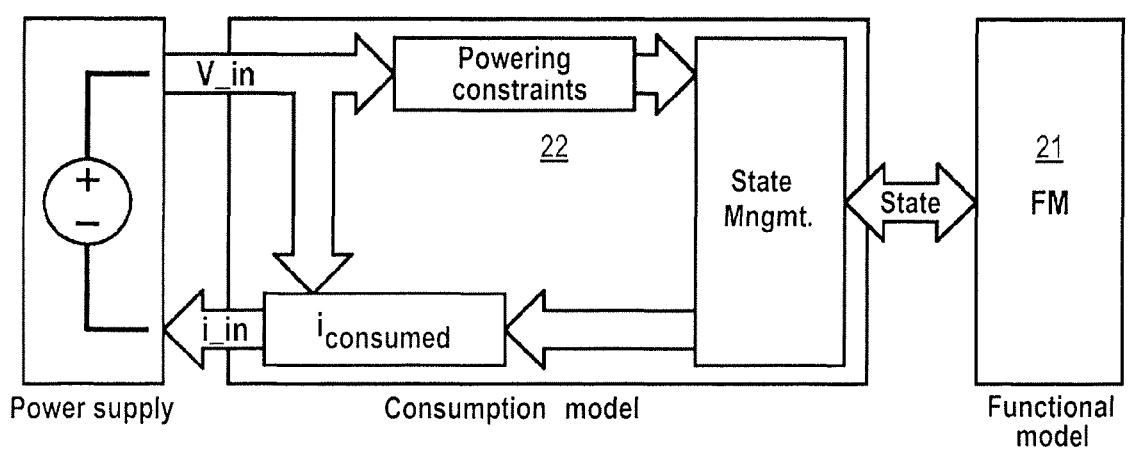
FIG. 2c schematically illustrates a simulated consumption part of the functional electronic component model.

FIG. 2c schematically illustrates the simulated consumption part 22 of a functional component. Part 22 models the consumption of the component taking into consideration the operating state, powering voltage and temperature thereof.

The part simulating consumption of the model, simulates the instantaneous intensity consumed by the component.

The part simulating the consumption of the model of an analogue/digital converter for example reproduces the consumption associated with conversion of a given analogue signal taking into consideration its consumption values under the given conditions of powering voltage and temperature.

When one of the parts 21 or 22 of the model detects a change in operating state, it communicates the new operating state to the other part of the model to ensure the synchronisation of the two parts 21 and 22 of the model. For example, if the powering voltage is insufficient to guarantee operation of the component, the simulated consumption part of the model 22 transmits the inactive operating state to the functional part 21. If the functional part 21 changes operating state, this new state is transmitted to the simulated consumption part 22 so that it adopts an adequate consumption value.

Battery Model

A battery is considered as a group of electrical storage units connected together to create an electric voltage generator of desired capacity.

The capacity of a battery is the quantity of stored electric charge for a given electric potential. It is defined as the sum of the electric charges of an element divided by the potential of this element.

Contrary to stabilised or ideal powering sources, batteries have a limited capacity.

This capacity essentially varies as a function of the chemical compounds used in the electrolyte (e.g. lithium ion, nickel-cadmium, zinc-acid, etc.) and of the form factor of the battery (e.g. CR2032, AA, AAA, etc.).

In general, the capacity of a battery is so-called nominal capacity when the battery is fully charged. When the capacity of a battery has already been partly used, the remaining capacity is called the residual capacity or the residual. Whether nominal or residual, the capacity of a battery is expressed in A·h or in W·h.

Also, the powering voltage of batteries varies throughout the discharge thereof. The more a battery discharges the fewer the number of available transferable charges. The direct consequence is that the electric potential of the battery (which is none other than its powering voltage) will decrease as and when the residual capacity decreases. The manner in which this powering voltage varies again depends on the inner structure of the battery.

In addition, the entirety of the nominal capacity of a battery is not necessarily available. When considering continuous discharge, if the value of the current consumed by the load is higher than the value of the nominal current, then not all the capacity of the battery will be accessible. The accessible part of the nominal capacity of a battery is called the effective capacity. The proportion of accessible capacity is dependent on the instantaneous current used by the load, the temperature at which the battery lies and, as previously, on the intrinsic characteristics of the battery.

The nominal current of a battery is defined as being the current over and above which the behaviour of the battery becomes non-linear.

Figure 1:
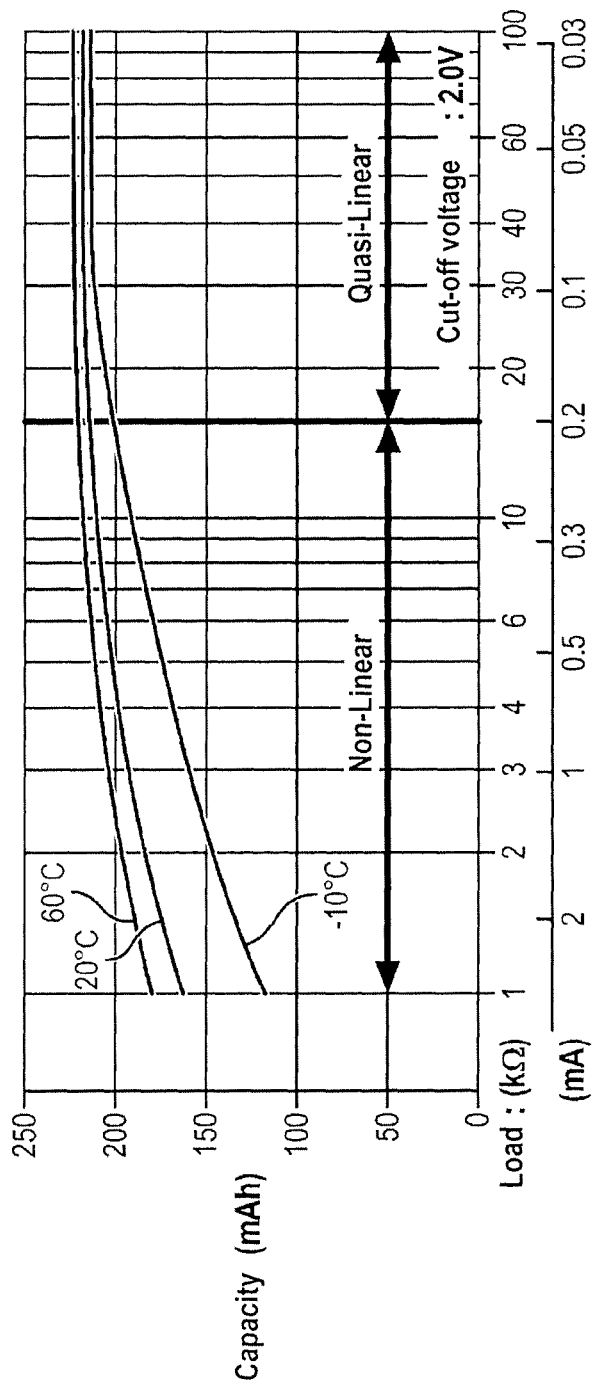
FIG. 1 illustrates the discharge curve of a battery i.e. its effective capacity as a function of load.

Observation of the discharge characteristics of a battery allows defining two main operating modes (as illustrated in FIG. 1).

The battery has a first operating state and a second operating state. The first operating state is qualified as being "quasi-linear", as opposed to the second operating state that is qualified as being "non-linear". The term "quasi-linear" merely means that the battery exhibits behaviour closer to linear behaviour in the "quasi-linear" operating state than in the "non-linear" operating state.

When the instantaneous current supplied by the battery to the load is lower than the nominal current, the battery is in a quasi-linear operating area in which the residual capacity of the battery varies quasi-linearly with the intensity of the instantaneous current delivered by the battery.

When the instantaneous current delivered by the battery to the load is greater than the nominal current, the battery is in a non-linear operating area in which the residual capacity of the battery varies non-linearly with the intensity of the instantaneous current delivered by the battery.

Figure 3:
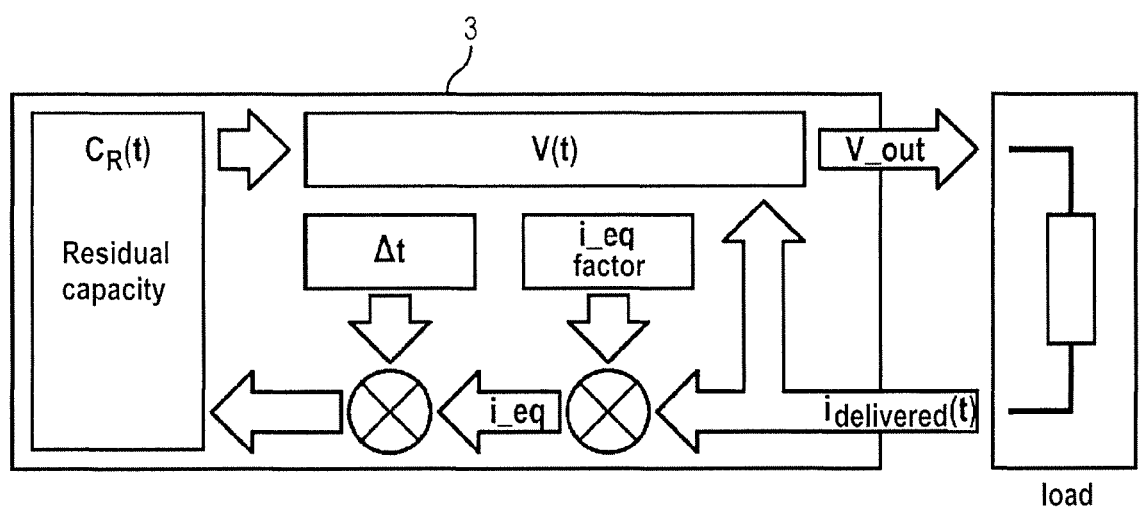
FIG. 3 schematically illustrates a battery model.

For best modelling of the operation of a battery, as illustrated in FIG. 3, the battery model includes at least a current residual capacity of the battery $C_R(t)$, a delivered instantaneous current $i_{delivered}(t)$, and a powering voltage $V(t)$ of the battery as parameters.

Further, the battery model has two operating states including a quasi-linear operating state in which the residual capacity of the battery varies quasi-linearly with the intensity of the instantaneous current delivered by the battery, and a non-linear operating state in which the residual capacity of the battery varies non-linearly with the intensity of the instantaneous current delivered by the battery.

Piloting of Simulated Time

A simulated time piloting function manages the chronological progress of simulated time, from the starting time of simulation up until its end time.

The simulated time piloting function permanently keeps up to date a schedule or list of events in which the times of future events are recorded.

A change in operating state of a functional component is considered to be an event.

To calculate the time of the following event, the time of the event the closest to the current time must be sought.

Figure 4:
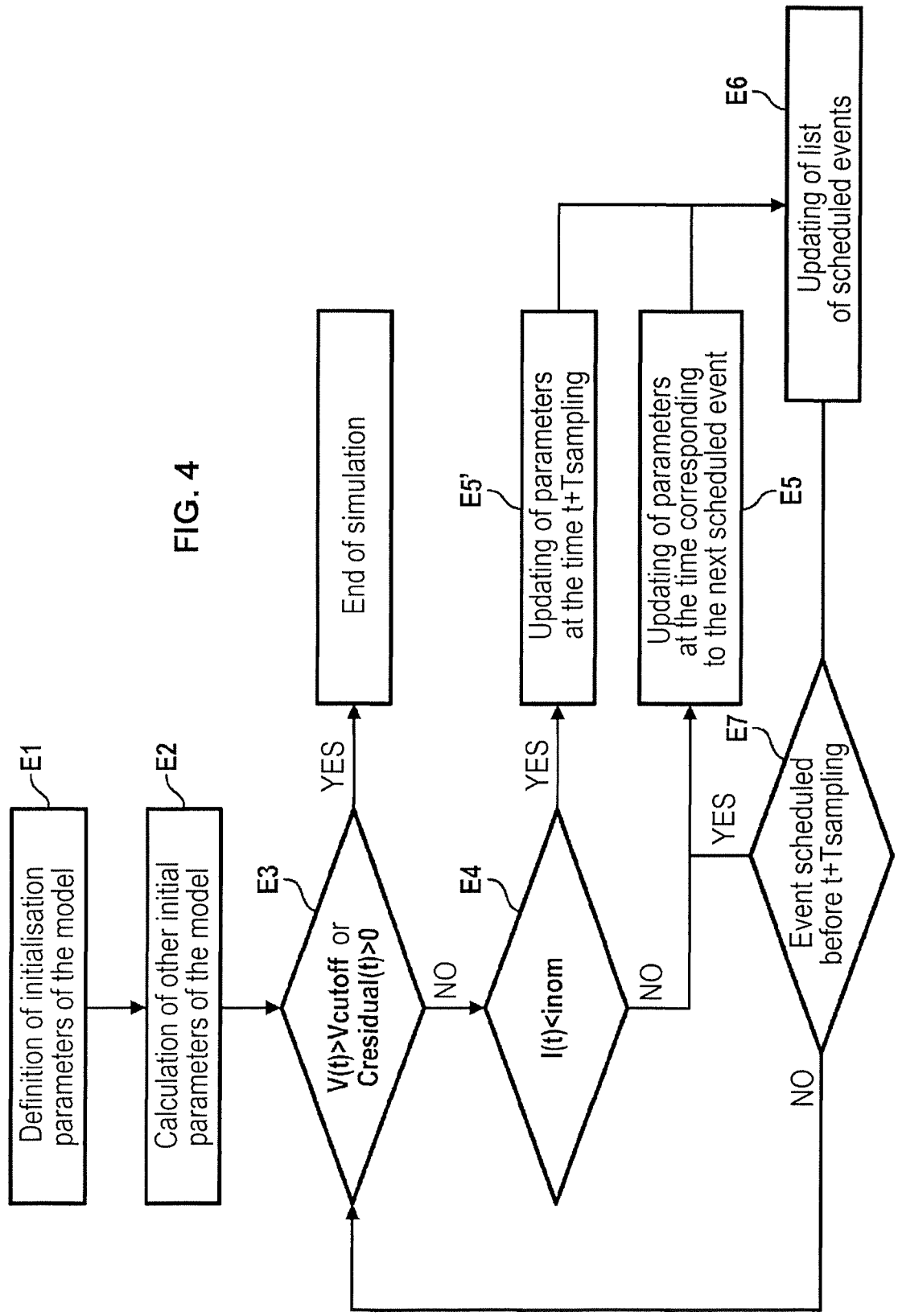
FIG. 4 schematically illustrates the different steps of the simulation method of the invention.

FIG. 4 illustrates the different steps of the simulation method according to an embodiment of the invention.

At a first step E1, the user defines the initialisation parameters of the model such as the nominal capacity of the battery, the cut-off voltage of each component, the consumption of each component as a function of its operating mode, etc.

At a second step E2, the simulator computes the values of the other initial parameters of the model from the initialisation parameters.

At a third step E3, the simulator verifies first that the voltage at the terminals of the battery is lower than a predefined threshold value corresponding to a cut-off voltage, and secondly that the residual capacity is lower than a predefined threshold value that may be zero.

If one of these conditions is met, the simulation stops. The duration of time between the time corresponding to the starting of simulation and the time corresponding to the end of simulation is equal to the energy self-sufficiency of the battery.

If none of these conditions is met, the simulation continues.

At a fourth step E4, the simulator verifies whether the current delivered by the battery is greater than its nominal current.

If the instantaneous current is smaller than the nominal current of the battery, the simulation method at step E5, updates the parameters of the model at the time corresponding to the next change in state of one of the functional electronic components. For this purpose, the piloting function searches the time of the event that is closest to the current time in the list of future events.

If the instantaneous current is greater than the nominal current of the battery, the simulation method calculates the value of the time step $T_{sampling}$ at step E5', then at step E5'' updates the parameters of the model at time $t+T_{sampling}$, remote from the current time t of the time step $T_{sampling}$ (also called refresh period).

The value of the time step $T_{sampling}$ determined at step E5' can be constant or adjusted as a function of the degree of non-linearity of the battery. In the event of adjustment, the greater the instantaneous current compared with the nominal current of the battery, the smaller the time step $T_{sampling}$. In particular, the duration of the time interval can be inversely proportional to the value of the delivered instantaneous current $i_{delivered}(t)$, when the battery is in non-linear operating state.

Also, when a component changes operating mode, the current it consumes also varies. This leads to a variation in the powering voltage of the battery, which will lead to a variation in the current consumed by all the components powered by the battery.

Figure 6:
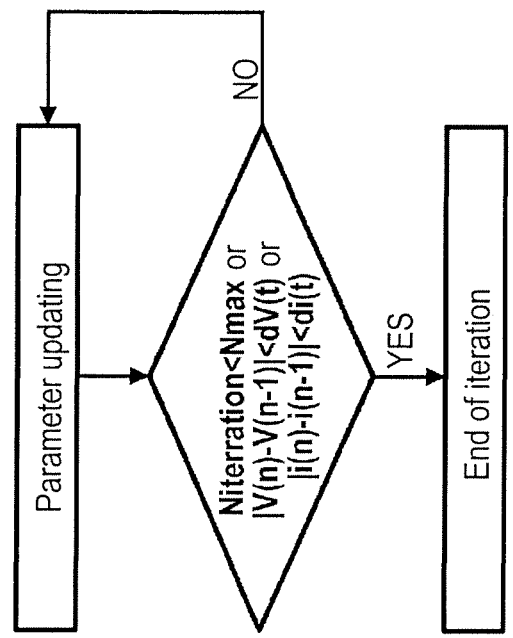
FIG. 6 schematically illustrates an embodiment of the invention in which the parameters are iteratively updated.

As illustrated in FIG. 6, the parameters of the model are then updated iteratively to converge the pair formed by powering voltage of the battery and current consumed by the component.

The iterations terminate when one of the following three conditions is met: 1) when the number of iterations reaches a value Nmax (e.g. 10 iterations), 2) when the difference between two values of powering voltages of the battery calculated over two successive iterations is lower than a threshold dV(t) (e.g. 0.1% of the nominal powering voltage of the battery), 3) when the difference between two values of current consumed by the component, calculated over two successive iterations, is lower than a threshold di(t) (e.g. 0.1% of the nominal current of the battery).

The iterations are executed at steps E5'' and E5.

At step E7, the simulator verifies whether the next event is scheduled before time $t+T_{sampling}$. If this is the case, the simulation method at step E5, updates the parameters of the model at the time corresponding to the next change in state of one of the functional electronic components.

If the instantaneous current is smaller than the nominal current of the battery, the simulation method, at step E5, updates the parameters of the model at the time corresponding to the next change in state of one of the functional electronic components. For this purpose, the piloting function searches the time of the event that is closest to the current time in the list of future events As a result, the updating step is executed:
periodically, at variable or constant time intervals, when the battery is in non-linear operating state, the battery being in non-linear operating state when the instantaneous current is greater than the nominal current of the battery; and
at each change in operating state of one of the functional electronic components, when the battery is in quasi-linear operating state, the battery being in quasi-linear operating state when the instantaneous current is equal to or smaller than the nominal current of the battery.

With the method it is therefore possible to adjust the frequency of updates of the battery as a function of the required accuracy. When the battery behaves linearly, the updates occur only when a component changes state. In the reverse, if the battery behaves non-linearly the updates occur within a time interval defined by the step (also called refresh period) $T_{sampling}$ for accurate reproduction of all the non-linearities of the battery.

Steps E5 and E5' consisting of updating parameters of the model comprise the following sub-steps:
updating the values of the consumed instantaneous current $i_{consumed}(t_i)$ of the different functional components as a function of the preceding value of the powering voltage V $(t_{i-1})$ and of the current state of the functional component;
updating the value of the delivered instantaneous current $i_{delivered}(t_i)$ as a function of the values of the consumed instantaneous current $i_{consumed}(t_i)$ of the different functional components;
updating the value of the residual capacity $C_R(t_i)$ as a function of the preceding value of the residual capacity $C_R(t_{i-1})$, of the value of the delivered instantaneous current $i_{delivered}(t_i)$ and of the lapsed time $\Delta t$ since the last update;
updating the value of the powering voltage $V(t_i)$ as a function of the updated value of the residual capacity of the battery $C_R(t_i)$.

The updated value of residual capacity $C_R(t_i)$ is typically calculated using the equation:

$$C_R(t_i) = C_R(t_{i-1}) - (i_{eq}(t_i) \times \Delta t) \text{ with } i_{eq}(t) = \frac{Cnominal}{Ceff(i(t))} \times i_{delivered}(t),$$

with $\Delta t = t_i - t_{i-1}$, with $t_i$ being the time of said update and $t_{i-1}$ the time of the previous update;

Cnomninal corresponding to the nominal capacity of the battery;

Ceq(i(t)) corresponding to the effective capacity of the battery.

The value of the powering voltage $V(t_i)$ is typically calculated using the equation:

$$V(t_i)=(V\text{nominal}\times f(C_R(t_i)), \text{ with:}$$

$f$ corresponding to a polynomial interpolation function of variable degree, determined from the documentation of the battery manufacturer. For example, for a battery of AA type, of the tradename Duracell®, MN1500 having Alkaline Manganese chemical constituents, this function is defined by the following equation:

$$f(C_R(t_i))=1.0658\times C_R(t_i)^3-1.877\times C_R(t_i)^2+1.292\times C_R(t_i)+0.5066$$

Vnominal corresponding to the nominal voltage of the battery.

Since the internal resistance of the battery $r(C_R)$ is taken into account, the powering voltage V(t) is updated as a function of the new value of the residual capacity $C_R(t)$ and of the value of the instantaneous consumed intensity i(t), typically using the equation:

$$V(t_i)=(V\text{nominal}\times f(C_R(t_i))-(i(t_i)\times r(C_R).$$

The updating of parameters may modify the list of future events and, in particular, it may create other events. On this account, at a sixth step E6, after each updating of parameters, the piloting function updates the list of scheduled future events.

Figure 5:
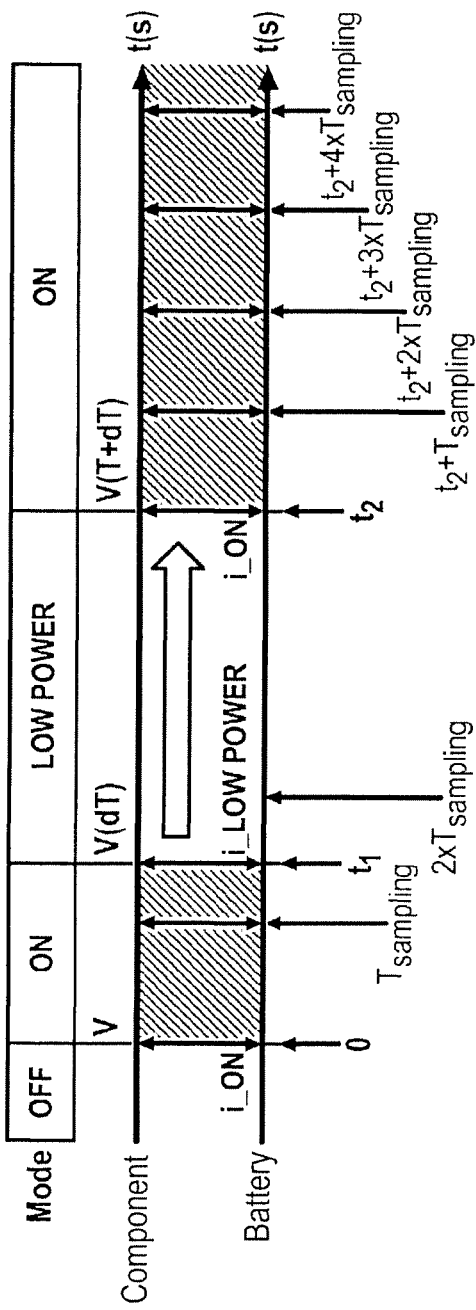
FIG. 5 illustrates an example of an embodiment of the method.

FIG. 5 illustrates an example of an embodiment of the method for an electronic circuit comprising a single battery and a single functional electronic component. It is assumed that in the active ON state, the instantaneous current delivered by the battery $i_{delivered}(t_i)$ is greater than the nominal current, and that in the standby LOW POWER state the instantaneous current delivered by the battery $i_{delivered}(t_i)$ is zero.

At time 0, the functional electronic component changes from the inactive OFF state to the active ON state. This change in operating state forms an event. The simulator updates the parameters of the model at time 0.

The functional electronic component being in the active ON state, the instantaneous current delivered by the battery $i_{delivered}(t_i)$ is greater than the nominal current. The next updating of the parameters will therefore take place at time $t=0+T_{sampling}$. At time $t_1$, the functional electronic component changes from the active ON state to the standby LOW POWER state. This change in operating state forms an event. The next event is scheduled at time $t_1$ before time $t=2*T\text{sample}$. The simulator updates the parameters of the model at time t1.

The functional electronic component being in the standby LOW POWER state, the instantaneous current delivered by the battery $i_{delivered}(t_i)$ is smaller than the nominal current. The simulator therefore updates the parameters of the model at the time corresponding to the next scheduled event at time $t_2$.

At time $t_2$, the functional electronic component changes from the standby LOW POWER state to the active ON state. The functional electronic component being in the active ON state, the instantaneous current delivered by the battery $i_{delivered}(t_i)$ is greater than the nominal current. The simulator therefore updates the parameters of the model at times $t_2+T_{sampling}$, $t_2+2*T_{sampling}$, $t_2+3*T_{sampling}$, . . . .

The different steps of the method are implemented by a computer and executed using program code instructions.

The invention therefore also concerns a computer program product, this program able to be implemented by processing means or a computing system, this program comprising code instructions adapted for implementing a method according to the invention such as described above.

This program can use any programming language, and may be in the form of a source code, object code, or an intermediate code between source code and object code, such as in a partly compiled form, or in any other desirable form.

The invention also concerns a data medium readable by a computer and comprising computer program instructions such as mentioned above. The data medium may be any entity or device capable of storing the program. For example, the medium may comprise storage means such as ROM means e.g. a CD ROM or ROM of a microelectronic circuit, or other recording means. Also, the data medium may be a transmissible medium such as an electrical or optical signal that can be conveyed via an electrical or optical cable, via radio or other means. Alternatively, the data medium may be an integrated circuit in which the program is incorporated, the circuit being adapted to execute or to be used for execution of the method under consideration.

The invention claimed is:

1. A method of simulating the operation of an electronic circuit implemented by computer, the electronic circuit comprising at least one battery and at least one functional electronic component powered by the battery, the electronic circuit being modelled by a numerical model wherein:
the battery has two operating states, including a quasi-linear operating state in which a residual capacity of the battery varies quasi-linearly with the intensity of the instantaneous current delivered by the battery, and a non-linear operating state in which the residual capacity of the battery varies non-linearly with the intensity of the instantaneous current delivered by the battery,
the functional electronic component has several operating states, each operating state corresponding to an instantaneous current consumed by the electronic component,
the method comprising successive steps (E5, E5') consisting of updating parameters of the model, the parameters including a current residual capacity of the battery $C_R(t)$, an instantaneous current $i_{delivered}(t)$ delivered by the battery, a current value of battery internal resistance and a current powering voltage of the battery V(t), the updating steps being executed:
repetitively at a predefined simulated time interval, when the battery is in the non-linear operating state, and
at each change in operating state of one of the functional electronic components, when the battery is in the quasi-linear operating state;
wherein the updating steps of the parameters of the model (E5, E5") include the following sub-steps to update the parameters of the model:
updating the values of the consumed instantaneous current $i_{consumed}(t)$ of the different functional components as a function of the preceding value of the powering voltage V (t) and of the current state of the functional component;
updating the value of the delivered instantaneous current $i_{delivered}(t)$ as a function of the values of the consumed instantaneous current $i_{consumed}(t)$ of the different functional components;

updating the value of the residual capacity $C_R(t)$ as a function of a preceding value of the residual capacity $C_R(t)$ of the value of the delivered instantaneous current $i_{delivered}(t)$ and of a lapsed time $\Delta t$ since the last update;

updating the value of an internal resistance $r(t)$ of the battery as a function of the updated value of the residual capacity of the battery $C_R(t)$;

updating the value of the powering voltage $V(t)$ as a function of the updated value of the residual capacity of the battery $C_R(t)$ and of the updated value of the internal resistance of the battery; and the updated value of the residual capacity $C_R(t)$ is calculated using the equation:

$$C_R(t) = C_R(t_{i-1}) - (i_{eq}(t_i) \times \Delta t) \text{ with } i_{eq}(t) = \frac{Cnominal}{Ceff(i_{delivered}(t))} \times i_{delivered}(t),$$

with:

$\Delta = t_i - t_{i-1}$, with $t_i$ being the time of said update and $t_{i-1}$ being the time of the previous update;

Cnominal being the nominal capacity of the battery;

being the effective capacity of the battery.

2. The simulation method according to claim 1, the updating steps being executed repetitively at constant time interval when the battery is in the non-linear operating state.

3. The simulation method according to claim 1, the updating steps being executed repetitively at variable time interval, the duration of the time interval being inversely proportional to the value of the delivered instantaneous current $i_{delivered}(t)$, when the battery is in the non-linear operating state.

4. The simulation method according to claim 1, the functional electronic component being modelled by a functional electronic component model having as parameters at least a consumed instantaneous current $i_{consumed}(t)$.

5. The simulation method according to claim 1, the battery being modelled by a battery model having at least the powering voltage $V(t)$, the delivered instantaneous current $i_{delivered}(t)$ and residual capacity $C_R(t)$ as parameters.

6. The simulation method according to claim 1, the functional electronic component model and the battery model further having a component temperature and a battery temperature as parameters.

7. The simulation method according to claim 1, comprising steps of:
(E4) comparison of the instantaneous current $i_{delivered}(t)$ delivered by the battery, with a threshold value corresponding to the nominal current of the battery;
if the delivered instantaneous current $i_{delivered}(t)$ is smaller than the nominal current of the battery, the parameters of the model are updated at the updating steps of parameters of the model (E5), at the time corresponding to the next change in mode of the functional electronic component;
if the delivered instantaneous current $i_{delivered}(t)$ is greater than the nominal current of the battery, the parameters of the model are updated at the updating steps of the parameters of the model (E5"), at the next time remote of the time step from a current time.

8. The simulation method according to claim 1, the model comprising a piloting function of simulated time defining the operating states of the functional electronic components and times of change in operating states, from the starting time of simulation up until an end time, the method further comprising a step (E6), after each updating step of the parameters (E5, E5'), of updating the time piloting function.

9. The simulation method according to claim 1, the steps (E5, E5') of updating the parameters of the model being repeated until the voltage at the terminals of the battery $V(t)$ is lower than a predefined threshold value corresponding to the cut-off voltage of the battery, or until the residual capacity of the battery $C_R(t)$ is lower than a predefined threshold value.

10. Method for determining the energy self-sufficiency of a battery in an electronic circuit comprising at least one battery and a functional electronic component powered by the battery, consisting of simulating the operation of the electronic circuit with a method according to claim 9, the energy self-sufficiency of the battery being determined as being equal to the duration of time between the time corresponding to the starting of simulation and the time corresponding to the end of simulation.

11. A computer program product comprising program code instructions for executing the steps of the method according to claim 1 when said program is executed on a computer.

* * * * *